United States Patent [19]

Hartmann et al.

[11] 4,017,398

[45] Apr. 12, 1977

[54] DEVICE FOR THE CONTINUOUS SEPARATION OF MIXTURES OF SOLIDS AND FLUIDS

[75] Inventors: Otto Hartmann, Stuttgart; Hans Brunner, Steinmaur; Thomas Hartmann, Berlin, all of Germany

[73] Assignee: Firma Hamako Hartmann, Berlin, Germany

[22] Filed: Aug. 11, 1975

[21] Appl. No.: 603,567

[30] Foreign Application Priority Data

Aug. 13, 1974 Germany .................... 2439176

[52] U.S. Cl. .................... 210/350; 100/151; 210/400
[51] Int. Cl.² .................... B01D 33/32
[58] Field of Search .......... 210/350, 351, 386, 387, 210/391, 393, 396, 398, 399, 400, 401, DIG. 3; 100/101, 151–153; 162/213, 295; 198/160

[56] References Cited

UNITED STATES PATENTS

| | | | |
|---|---|---|---|
| 1,833,497 | 11/1931 | Prouty | 210/396 X |
| 1,879,474 | 9/1932 | Pontoppidan | 210/386 |
| 2,691,446 | 10/1954 | Murray | 210/387 X |
| 2,796,810 | 6/1957 | Müller | 162/295 X |
| 3,169,922 | 2/1965 | Hornbostel | 210/387 |
| 3,399,778 | 9/1968 | O'Neill | 210/387 |
| 3,654,074 | 4/1972 | Jacquelin | 162/213 |

Primary Examiner—Frank W. Lutter
Assistant Examiner—William A. Cuchlinski, Jr.
Attorney, Agent, or Firm—Burgess, Dinklage & Sprung

[57] ABSTRACT

Apparatus for continuous separation of solid-fluid mixtures comprising means for routing an endless band of filter cloth folded to form an endless tube which is longitudinally openable and closable to permit introduction of a mixture into the tube for filtering, and removal of solids following filtering. Means for introducing a mixture into the tube are followed by a filter unit which is adjustable in cross sectional flow area. The inlet means and filter unit are assembled on a first frame. A second frame outfitted with means for opening the tube for discharge of solids follows. The two frames are separable to provide a modular construction. Press units, also of modular construction, can be interposed between said frames, also as modules, and means are provided for adjusting the pressure exerted by the press units.

15 Claims, 22 Drawing Figures

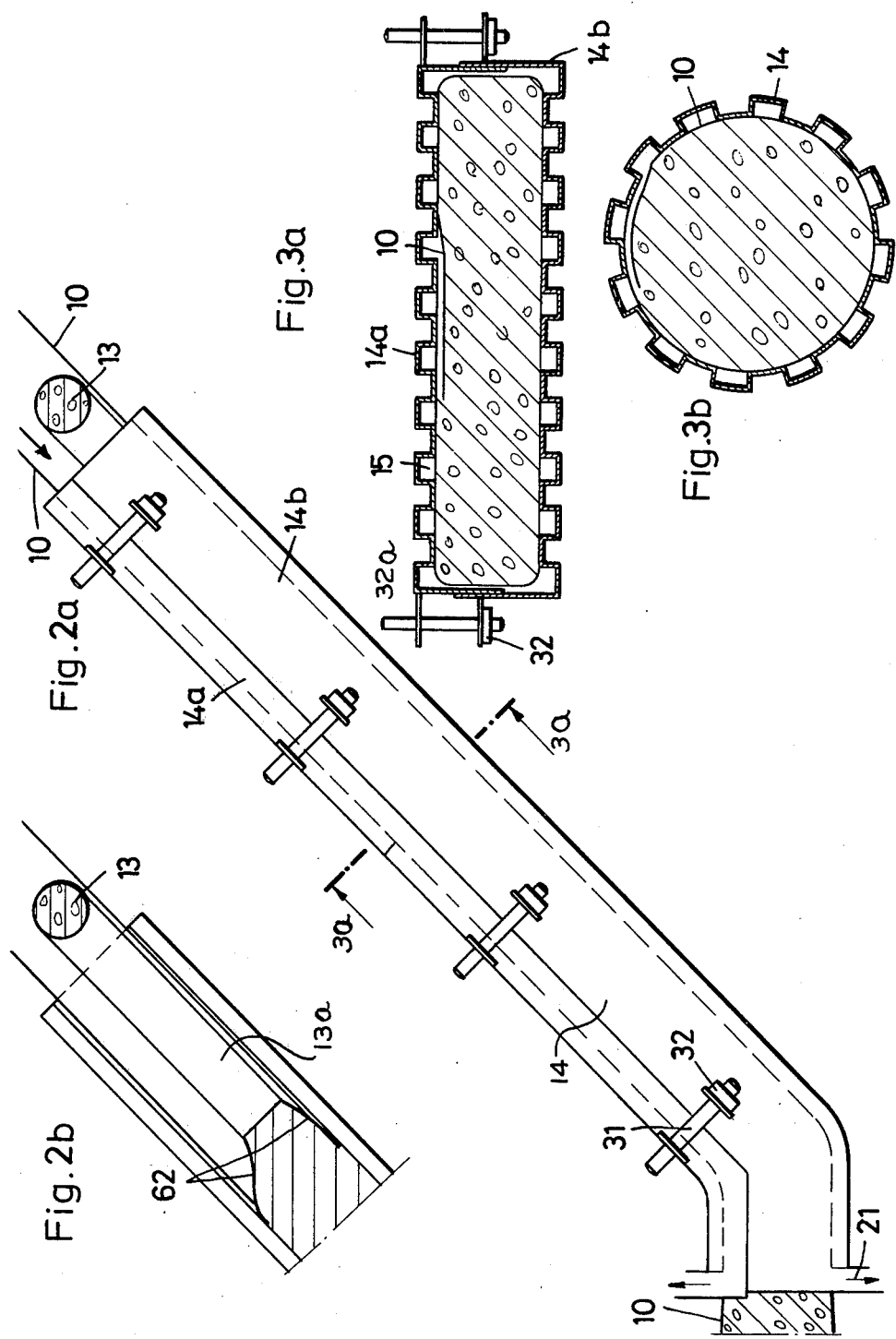

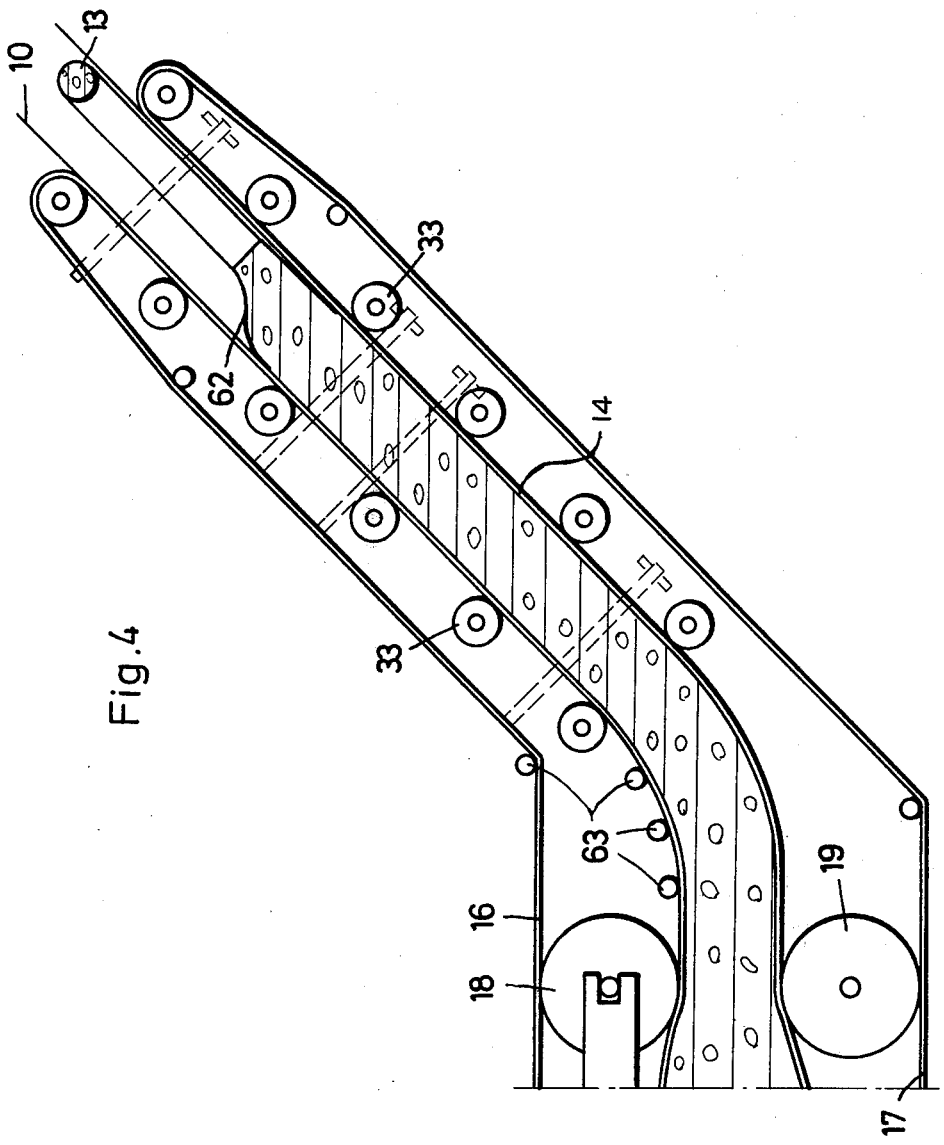

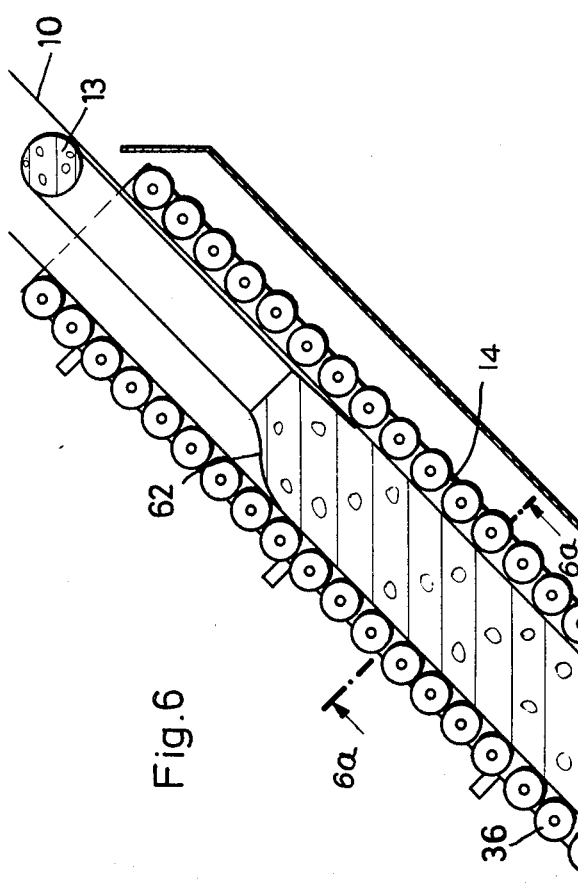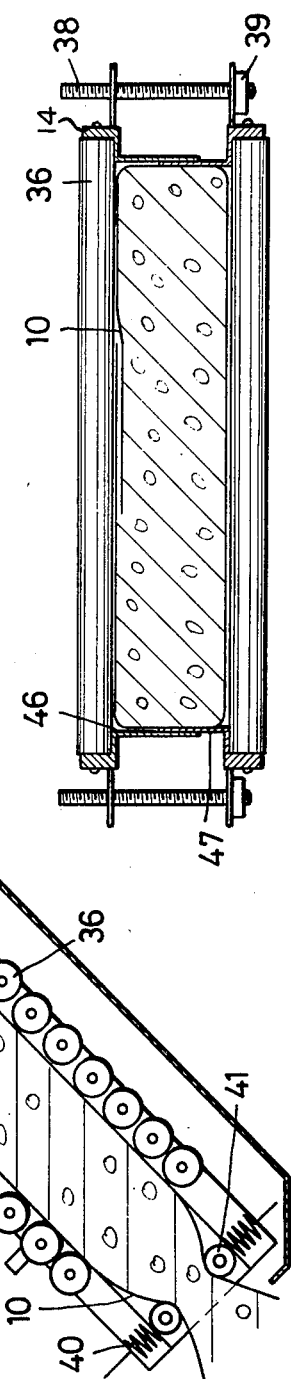

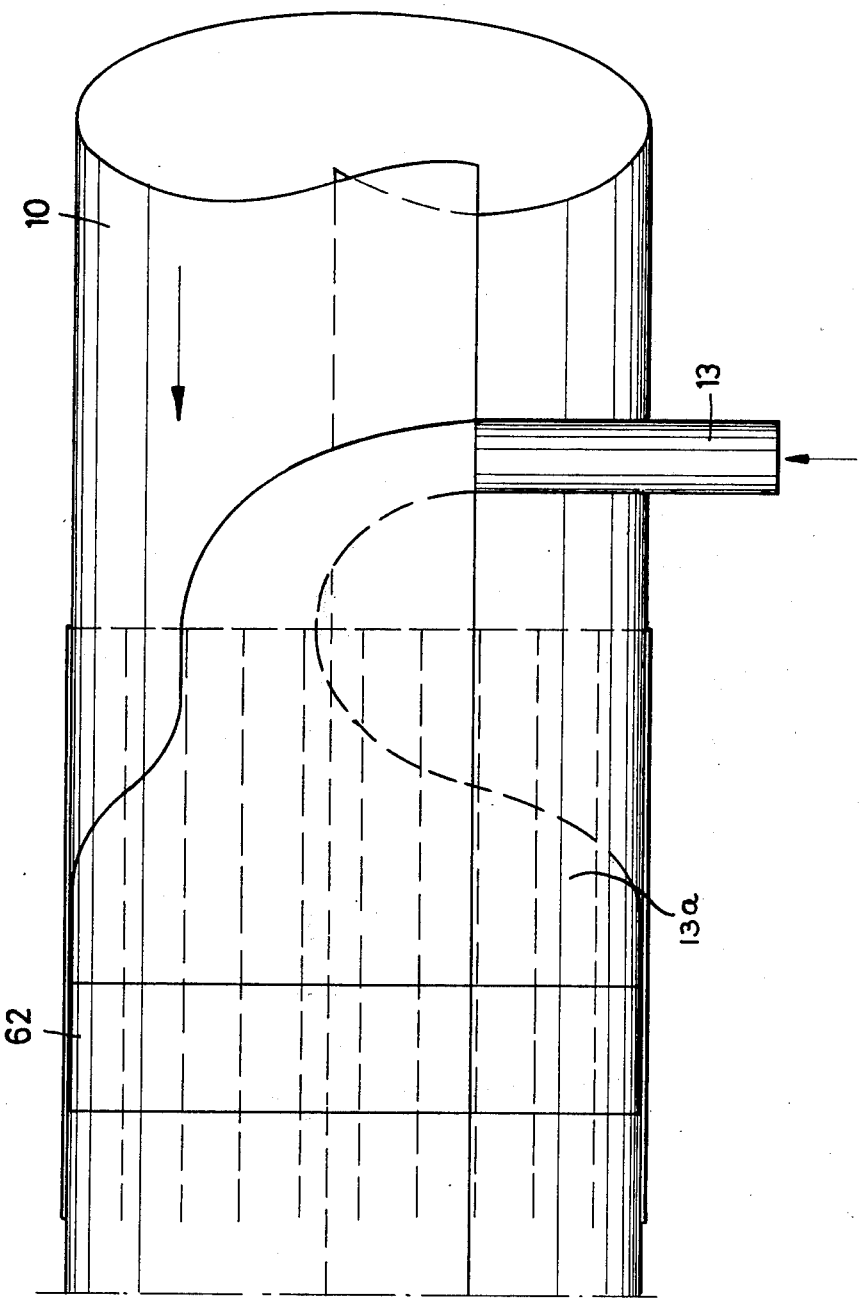

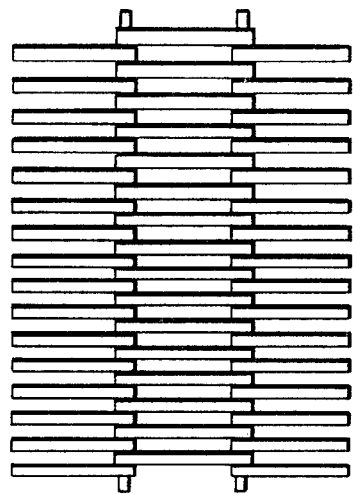
Fig.8a
Fig.8b
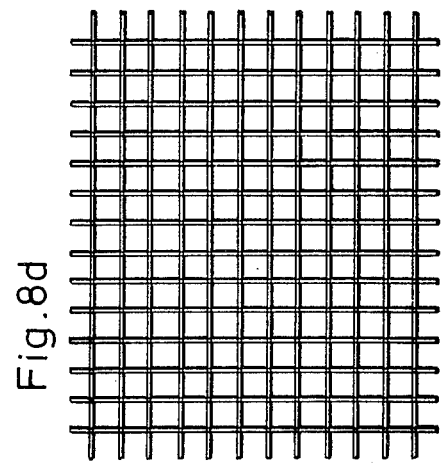
Fig.8a'
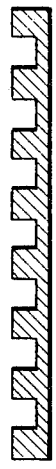
Fig.8c
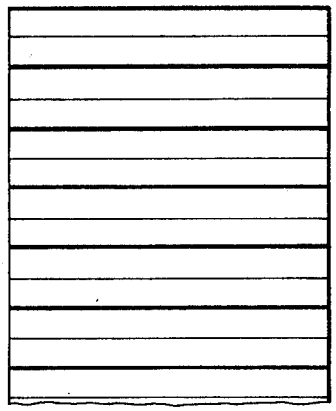
Fig.8b'
Fig.8d

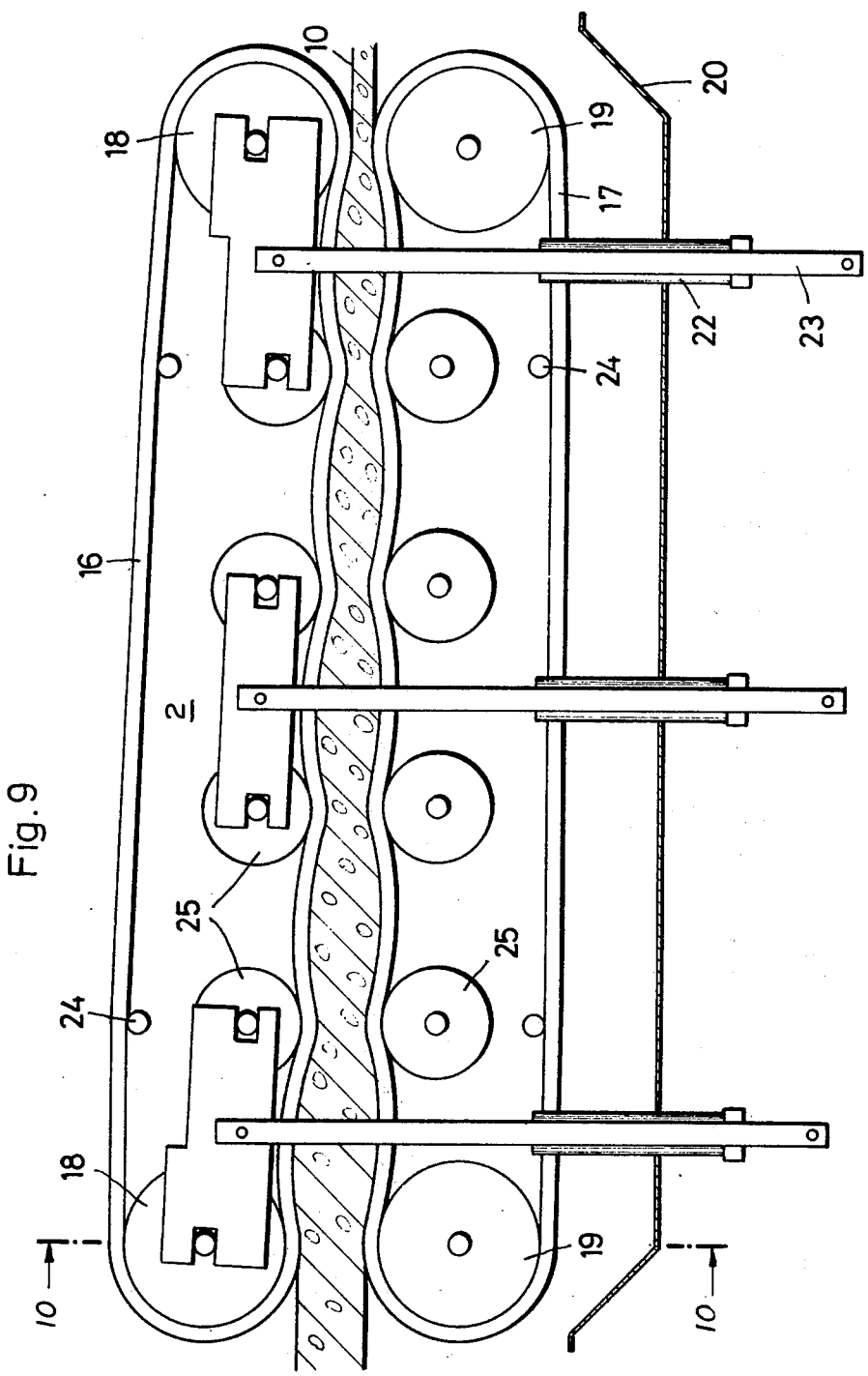

DEVICE FOR THE CONTINUOUS SEPARATION OF MIXTURES OF SOLIDS AND FLUIDS

The invention refers to a device for the continuous separation of solid-fluid, especially solid-liquid, mixtures of all kinds by use of a constantly acting pressure-filter that may or may not be used in connection with a press, a filter cloth, joined together to form a closed loop, and which is previous to fluids, forms a transport band which receives the material to be filtered or pressed, and is driven by several pressure rollers.

For separation of solid-fluid mixtures for example sieve drum filters are known as are vacuum drum filters which are especially suited to extract filtrates as well as to obtain the residual solids. Specialized forms of drum filters are the so called disk filter and also the drum cell filter which is a disk filter and consists of flat filter disks, that are divided into exchangeable sectors. Scrapers or rollers, which are adjustable on the side, are used to remove the filter cake.

A well known continuous filter press is the Swiss made "Tower-Filter-Press" that is known to the trade under the name of "GUVA." In this press the mash enters in the upper part into a wedgeshaped space that is formed by opposing filter belts that run parallel, with a space between, downward and is sealed by pressed on walls. The continuously forming filter cake is removed in the lower part of the "Tower" by use of mechanical pressure.

Filters under constant pressure, that are known today, however, have only fund limited use in industry since their filter and press operation has not produced satisfying results in all cases of application. Another known proposal for a continuous pressure filter arrangement consists of a filter tube, covered with a filtercloth, into which the material to be pressed is pushed with about 3 atm. pressure. The solids remaining in the tube are transported to the exit by a helical spiral while the filtrate runs off on the outside. To clean the filter water is forced through the filter tube. For this reason, this press cannot operate continuously since one filtration process must be alternated with one cleaning process. When the filter becomes impermeable the supply of mash must be stopped and water or steam has to be forced through the outer layer of the device in opposite direction so as to free the filter from blockage.

Very good filtering results have been obtained up to now with the known Chamber-Filter-Presses in which a multitude of identically built grill-like plates in frames set up one behind the other are hydraulically or mechanically pressed together to seal the filter spaces. With these filter presses it is possible to pull the filter cloths flat over the individual plates so that the change of cloths can be performed relatively easily. A disadvantage of these chamber filters is the fact that their working method is not continuous which requires a large expenditure of time and more than that, the cleaning is complicated. After opening of the press the filtercakes that stick to the cloths in the individual chambers have to be scraped off when taking out the plates (compare *Ullmann's Encyclopedia of Technical Chemistry*, 4th Ed., Vol. 2).

In addition, a well known belt-press used to press apples and other fruit used to produce juices should be mentioned in this context. This press makes use of a continuously rotating, endless conveyor belt of permeable synthetic fabric, that guides the fruit mash or similar filter material deposited on this belt, under another, endless cover band that is laid from above onto the filter material. Thereafter the fruit mash, between these permeable bands reaches a press zone that consists of press rollers arranged in pairs under and above the two mentioned bands (DT-OS No. 1,677,199). Before reaching the press zone the conveyor belt goes through a pre-press device in which a part of the fluid of the press material can be drained off. The press rollers within the press zone are arranged in pairs opposite each other. The row of rollers that rotate and at the same time carry between them, surrounded by the conveyor belt, the press material, are surrounded by the endless press-belts in such a way that they converge toward each other viewed in the direction of movement of the conveyor belt. The angle of inclination of the press belts towards each other within the press zone causes an increasing pressure upon the press material that is determined automatically as a function of the speed at which the material passes through; and thus the amount of fluid to be removed from a unit of volume in a unit time, provided an incompressible fluid is involved as is the case with fruit juices, is determined by speed. Especially in manually operated, intermittently working presses it is known, that the yield of extract for a certain press material does not by any means increase in proportion to increasing the absolute press pressure but that other parameters are also of importance as e.g. the amount and frequency of periodically changing pressure differences, the thickness of the filter-cake and others. The press bands, converging within the press zone and set up in a certain angle to each other do not allow for the possibility of a periodical or a periodical variation of the pressure because of their rigid wedge shape. Therefore the results are qualitatively not very satisfying because of the incompressability of the fluid to be pressed out when pressing solid/fluid mixtures of all kinds. The yields are equally unsatisfying since the remaining press cake contains a relatively high content of moisture.

THE INVENTION

At this point, the proposed invention takes over which has as its basis the task to improve a device for the continuous separation of solid/fluid mixtures of the nature described above in a way that it ensures complete flexiblity in regard to the performance of separation and quality, and which further provides modular construction permitting exchangeability and variability of single device modules.

The device constructed according to the invention, for the continuous separation of solid/fluid mixtures of all kinds in the form of a constantly acting pressure-filter ensures a simple and uninterrupted filtration and at the same time continuous cleaning of the filter cloth without any interruption of the working process. The speed of filtration can be determined by the pump-pressure under which the solid/fluid mixture is introduced into the filter channel. The discharging of the filter cake from the continuously moving filter band is accomplished by partially opening of the filter band at the discharging end of the device where continuous cleaning can be performed immediately. The pressure filter consists finally of a simple, preferably in its cross section variable channel through which the filter-band joined together into a tube is pulled, while the filter material under the pump-pressure is introduced at the beginning of the channel. The channel, formed rectangular or round in its cross section, can be set vertically or horizontally or at any desired position in between. The disadvantage, that existed in the known chamber filters, i.e. that the quality of filtration decreases with the thickness of build up of the filter cake, does not occur since it is a continuous process in which new filter material comes constantly in contact with newly cleaned filter cloth. The speed with which the filter cloth is moved can be adjusted and as a result, the filtering speed itself can be adjusted according to the speed of formation of the filter cake, so that optimally high capacities for the device can be obtained. Nearly every imaginable solid-fluid mixture can be filtered, such as mashes of all kinds, solutions with crystallized solids and other mixtures.

The constantly acting pressure filter can be used completely selectively and according to the modular principle in connection with one or more press units, so that a completely continuous and automatic filter band-press system results, that can be adjusted to any special demands.

Because of the arrangement of the press rollers according to the invention, and their independence from each other, the filter-press which is attached to the filter device can easily ensure that the press material is exposed within the press zones to individual and periodical pressures, in any desired sequence, and that can be adjusted to the relative moisture content of the filter cake. Between each two press rollers a certain pressure equalization takes place, but the press and filtering process is only dependent on pressure not distance. An added possibility of variation of the speed of transportation of the press material through one or more press units and of its height or thickness, results in an optimal influence on the yield, and quality of the press fluid and the content of solids. The single press units in connection with the pressure filter under constant pressure used as a pre-press ensures the selective filtration of different qualities of fluids. According to an appropriate selection of thickness of the filter cake, the specific filter-surface can be changed and optimally adjusted according to the qualities of the material to be pressed. With this device also, according to the invention, very small quantities of a particular press material can be processed; no minimum amount is necessary any longer. For different specific materials different filter cloths with different mesh size, can be used without any significant expenditure. Thus means are provided through which further improvements in quality as well as quantity can be obtained in contrast to the traditional presses with their strictly prescribed perforated cylinders.

The relatively high percentage of pre-filtration during the filtering process ensures the formation of a sufficiently firm filter cake within the filter cloth before the pressing process in one or more press units, so that e.g. when squeezing fruits or vegetables, the resulting reduced amount of residue contributes to an improvement of quality.

The modular composition of a complete, continuously working arrangement, finally renders superfluous any substantial use of storage containers and therefore a quality reducing storage of the press material before processing. Every adjustment is possible according to the requirements of the individual arrangement.

THE DRAWINGS

By means of the enclosed drawings, the invention shall be explained further. As depicted, FIG. 1 is a side elevation of an arrangement composed of a filter unit for pre-pressing and three press-units arranged behind each other as well as a cleaning and return unit;

FIG. 2a is an enlarged reproduction of the side view of a pressure-filter under constant pressure as it can be used as a pre-press-channel for the press-units arranged one after the other, as shown in FIG. 1;

FIG. 2b is a cross section through the upper part of the pressure filter shown in FIG. 2a, and including a reproduction of the point of filling of the filter-cloth;

FIG. 3a is a cross section through the filter unit of FIG. 2a along the line 3a—3a in FIG. 2a;

FIG. 3b is a cross section through a tubelike filter unit;

FIG. 4 is an alternative further design of a filter unit that leads continuously into a press-unit;

FIG. 5b is a cross section along the line 5b—5b of FIG. 5a;

FIG. 6 is a fourth design of the filter-unit;

FIG. 6a is a section along line 6a—6a of FIG. 6;

FIG. 7 is a showing of the point of entry of the filter material into the filter-unit;

Figure 10:
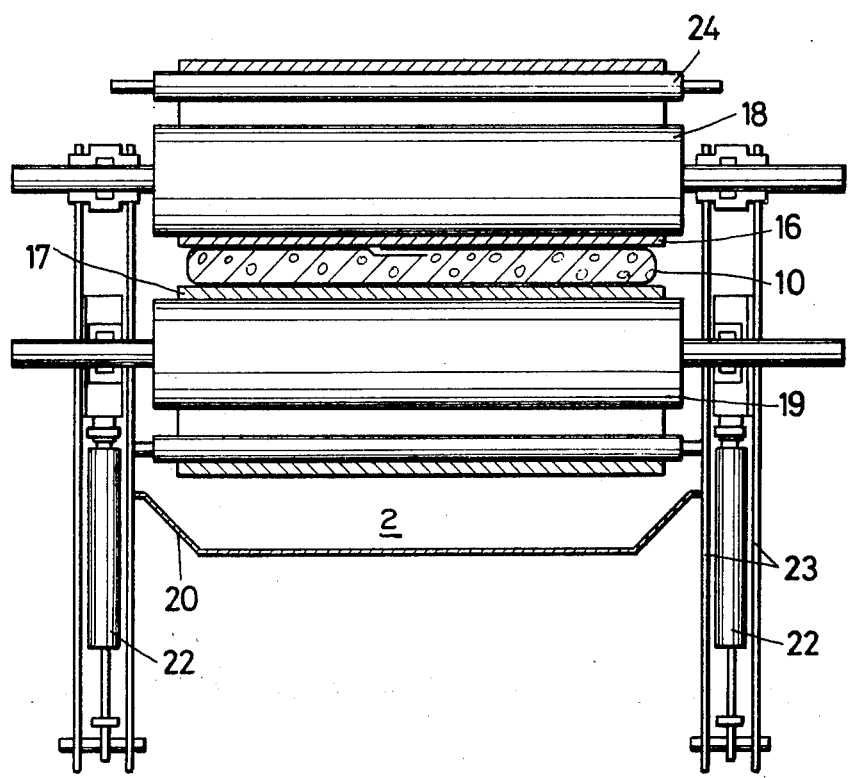
Figure 11:
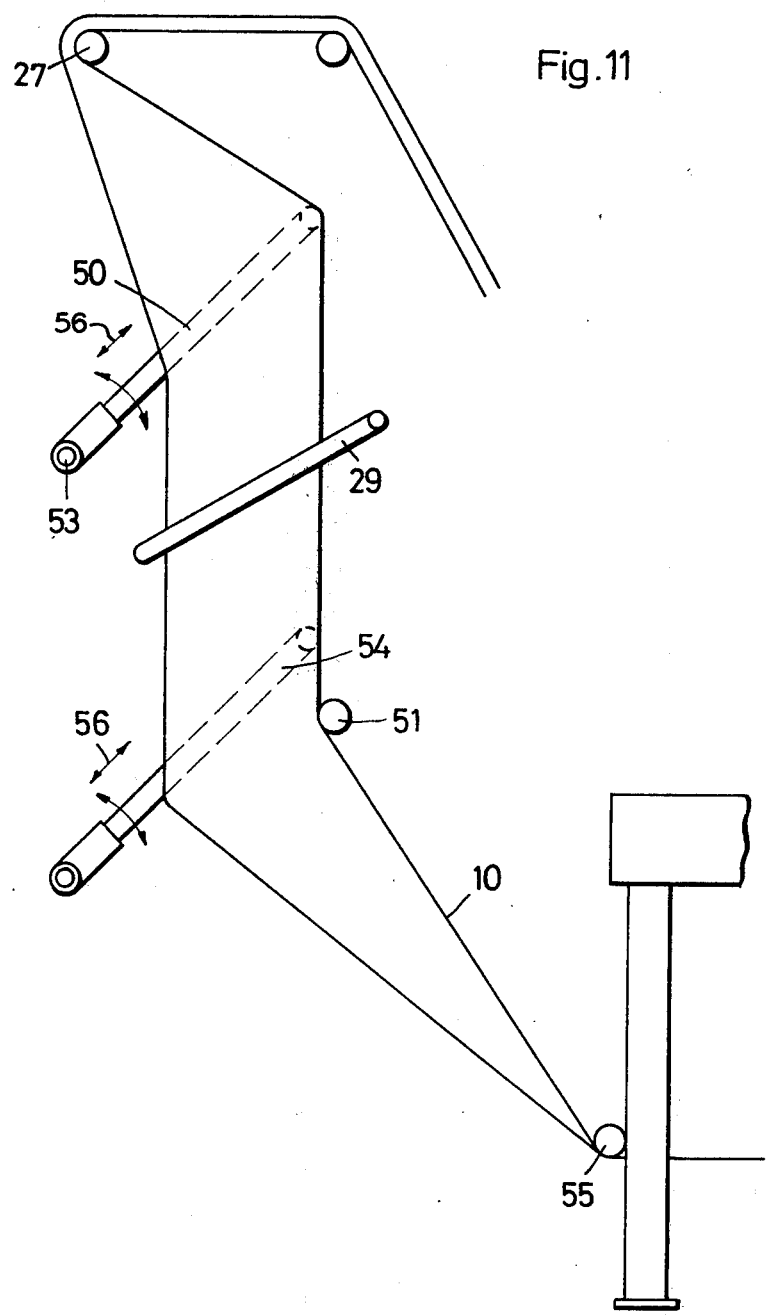
Figure 12:
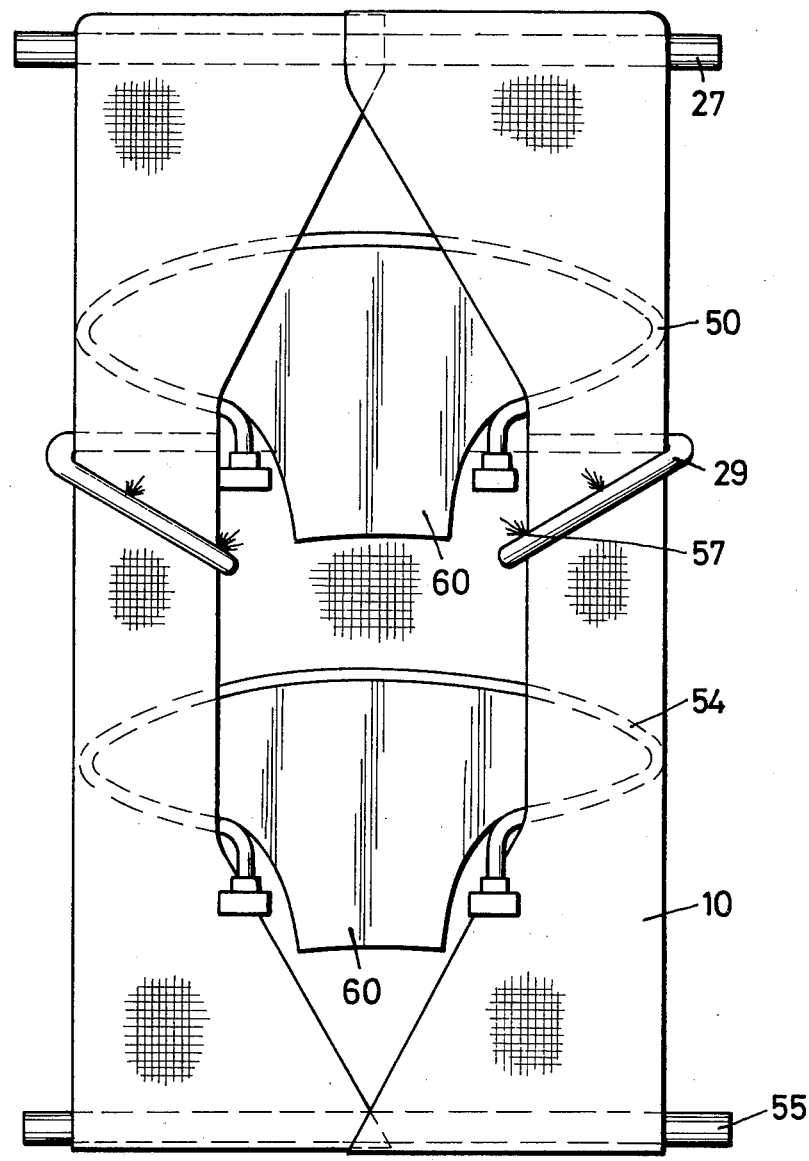

FIGS. 8a and 8b are examples of execution for the design of the bands, that are to be moved through the filter-units in cross section, and 8a' and 8b' are corresponding plan views;

FIGS. 8c and 8d are top views of different forms of bands such as metal-grill and wire-mesh;

FIG. 9 is showing of one of several press-units to be set modularly one after the other and selectively following the filter-unit;

FIG. 10 is a cross section through the press unit of FIG. 9 seen on line 10—10 in FIG. 9;

FIG. 11 is a showing of the cleaning and turning device for the filter-clother in side view;

FIG. 12 is a side view of part of the cleaning unit according to FIG. 11; and

Figure 13:
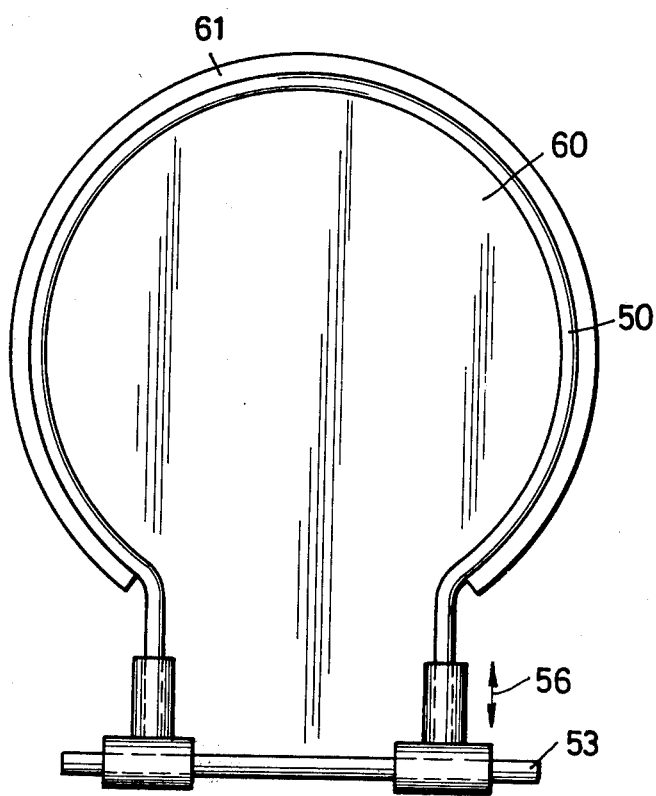

FIG. 13 is a plan view of the fold-out arm shown in FIGS. 11 and 12.

Figure 1:
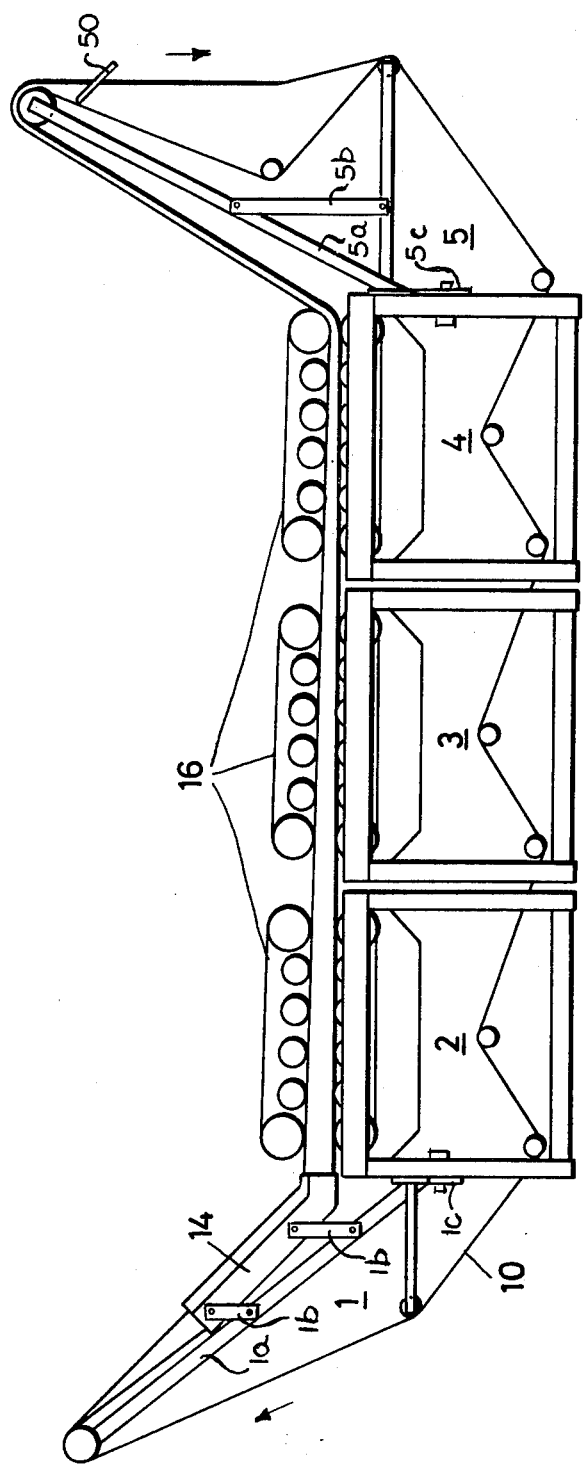

The filter unit under continuous pressure onto which are attached three press units according to FIG. 1 is built in the modular fashion as can be seen from FIG. 1. The single units are exchangeable among each other, any number of units can be added, or the filter and cleaning units can be run without the addition of the press units between them. In the executed FIG. 1 example the arrangement consists of three press-units; 2, 3 and 4, the filter unit 1 and unit 5 for cleaning the filter cloth and discarding the filter cake. Onto press-unit 2, which is the first unit in the direction of motion of the filter and press material, the filter-unit is mounted frontally to unit 1; however, it can also be fastened onto a separate mounting frame. The last press unit (4) has mounted on it the cleaning and turning device which, however, can be mounted in a separate frame.

The filter unit 1 in FIG. 1 which there finds use as a pre-press device in connection with the press-units 1 and 2, of course can be used as a mere continually acting filter where the material to be filtered is not exposed to pressure in the press modules. This is the case when the fluid/solid mixture consists of a solution with crystals that could be destroyed by any pressure application. The filter unit and the device-parts belonging to it are depicted in more detail in FIGS. 2 and 8 in several exemplifying and advantageous forms of execution.

The filter cloth 10, only shown partially which enters from the cleaning device to be described later into the front part of the filter unit is filled there with press or filter material by a feeding device 13 in form of a tube that ends with a flat nozzle 13a. The pump pressure with which the solid/fluid mixture is pumped through the tube into the flat nozzle and the adjustable height of the filter channel determine the amount of material in the filter cloth as well as the filter pressure maintained within the filter unit.

The filter cloth enters continuously — since it is closed within itself — into the upper part of the filter unit and goes through the filter unit and, if desired, through the adjoining units, passing the cleaning unit on the bottom of the device, and finally reaches the entrance of the filter unit again after being turned into an upward direction. Since the device in question is a continuously processing one in which the filling of filter material occurs constantly at one point, the discarding of the filtercake as well as the cleaning of the filter cloth at another point, the filter cloth 10 cannot be tube-like manufactured or closed in itself but it has to be a flat cloth, forming a continuous belt-like loop and then folded into a tube or something similar. The arrangement of the cloth within the filter unit is represented in FIG. 3a in a section, where a filter channel with a rectangular cross section is depicted whereas FIG. 3b shows a further example of execution of a filter channel with essentially round cross section.

The FIGS. 2a and 3a show a preferred example of execution of a filter unit in the form of a filter channel, this is composed of two halves 14a and 14b, which make possible a change of the channel cross section by allowing the distance between them to be adjustable. For this reason, threaded bolts 32a are provided that allow in connection with the accompanying nuts 32, a certain adjustment of the rectangular channel before filtering begins on every load. Through the pump that is not depicted and through the tube 13 and the accompanying flat nozzle 13a, more filter material than can be accepted is constantly forced toward the filter cloth 10 so that a constant tight filling within the filter channel is guaranteed. The fluid that runs off is replaced by constantly pumping in new filter material. To the degree to which the filter fluid (e.g. liquid) passes to the outside through the filter cloth 10 and flows off, because of the shaping of the filter channel between filter-cloth and channel wall, the filter cake forms within the cloth. To achieve a sufficient removal of filter-fluid from the solid/fluid mixture, it is important that the filter channel be of sufficient length, that the filter cloth is filled with sufficient pump pressure, and that, at least in some cases of application, the filter channel 14a, 14b be inclined sufficiently toward the horizontal line. The fluid exiting from the filter channel is removed through outlet 21, as indicated in FIG. 2. The solid/fluid mixture is prevented from escaping in opposite direction to the flat nozzle by the sealing valve 62 (FIG. 26).

The section representation of FIG. 3a seen in direction of the arrows 3a—3a in FIG. 2a shows the generally rectangular cross-section of the two U-shaped channel havles 14a and 14b that are assembled together. According to the quality of the filter material, the cross section and width for the specific filter surface is changeable as described above. A sensory device can be provided to determine the optimal filling of the chosen height of the channel, i.e. of any pre-chosen cross-section and the optimal pressure within the filter.

The filter channel 14 composed of the two halves 14a and 14b can also be built as a unit, closed in itself, and/or in form of a telescope, so that apart from its cross section also its length can be chosen as a variable. The filtering performance is among other factors dependent on the speed with which the filter cloth 10 is moved through the channel. The length of the channel has to be extended, in proportion to the higher speed at which filter cloth is moved.

Aside from the adjustability of the incline of the filter channel, its variable adjustability regarding the cross-section and with this the specific filter-surface, and the changeability of the length, it is also possible, to adjust the filter channel 14 in such a way that it tapers off continuously from the upper end of the entrance to the lower end of discharge, a means by which again an increase in filtering performance can be achieved in certain cases.

To guarantee a fast drainage without disruption of the fluid flowing from the permeable filter-cloth 10 within the filter-channel 14, the two halves 14a and 14b of the filter-channel are formed in such a way that at least their inner surface represents in its cross section the groove-shaped drainage-channels 15 to be seen in FIG. 3a and FIG. 3b, that extend along the longitudinal axes of the filter-channel 14 lying parallel facing each other. The width and depth of the drainage-channels is chosen in such a way that the filter cloth 10, as shown in FIG. 3a and 3b, lies close to the inner area-segments of the surface-structure of the channel, but does not penetrate into the channel grooves so that they remain open for the fluid to flow off. In connection with FIGS. 3a and 3b, we want to point out that the overlapping area of the filter-cloth 10 joined into a tube is preferably the upper middle area of the channel which is desirable for the folding apart of the filter cloth in the cleaning device to be described in detail below and for the filling of the filtering mixture through the flat nozzle.

In addition to the rectangular, groove-shaped, surface structuring of the filter channel and the round, tube-like shape, any other cross-sections are possible, e.g. triangular, halfround, elliptic and other cross-sectional shapes. The same is true for the shape of the cross-sections of the longitudinal grooves where, however, it is important when choosing their dimensions that they are such that the filter cloth 10 is not, or only insignificantly, allowed to enter into the grooves or channels that are to be kept open for the flowing off the filtered fluid.

In a further example of execution as shown by FIG. 4, the filter unit consists of two endless conveyor belts 16, 17, lying parallel and next to each other, with a distance between them. The upper and lower conveyor belts replace the upper and lower half, respectively, of the filter channel made of, e.g. stainless steel according to FIGS. 2a and 3a. The lower surface of the upper conveyor-belt 16 and the upper surface of the lower conveyor belt 17 constitute, together with two pieces of sheet metal or something similar on the side, that overlap the distance between the two conveyor belts over their length, a channel again rectangular in its cross-section through which the filter cloth 10 runs without friction. Both conveyor-belts can be made as perforated bands and run over a multiplicity of rollers 33 in close distance from each other that supply a constant guidance cross section. The conveyor-belts 16 and 17 can, after being led over direction-changing rollers 63, at the same time be used as the conveyor belts within the press units 2–4 (according to FIG. 1) if these are attached to the filter unit.

Figure 5A:
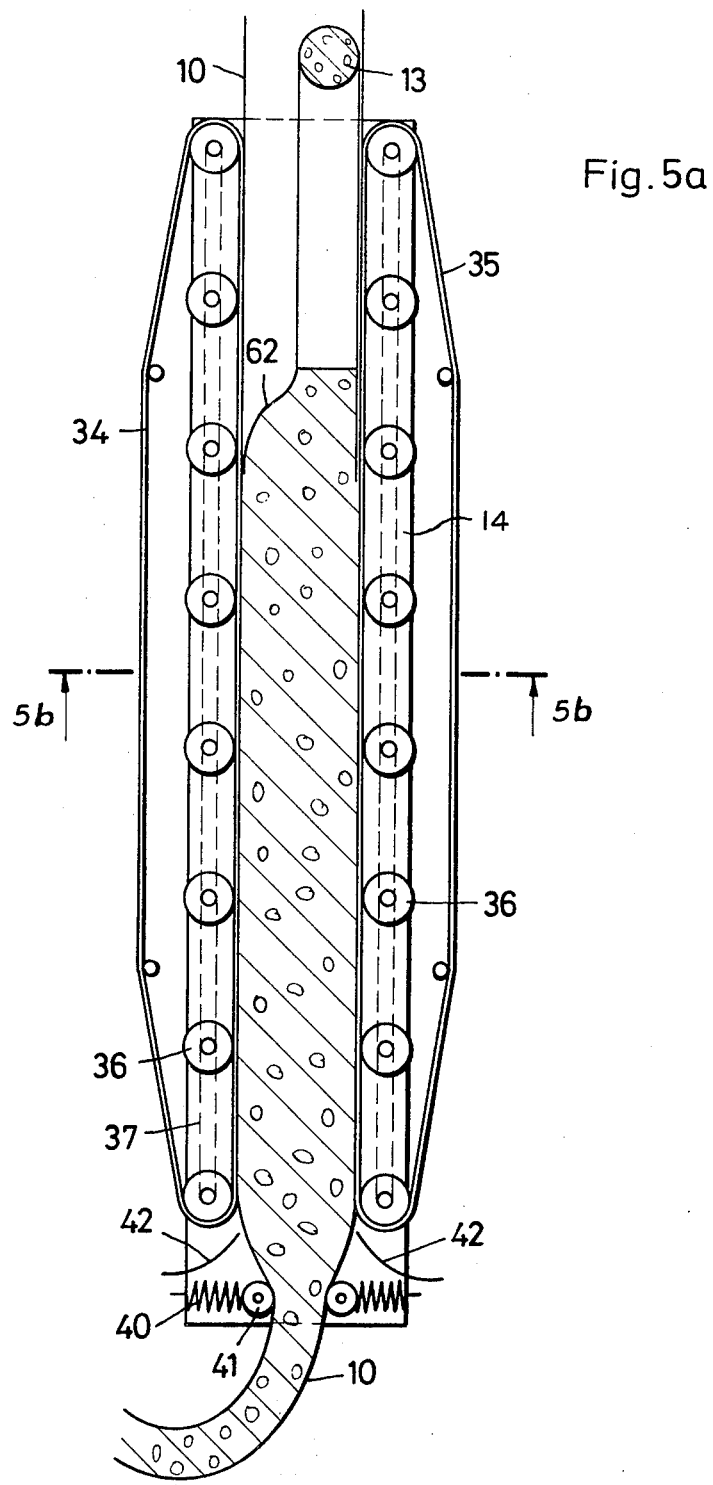
FIG. 5a is another cross section of a third design of the filter unit.
Figure 5B:
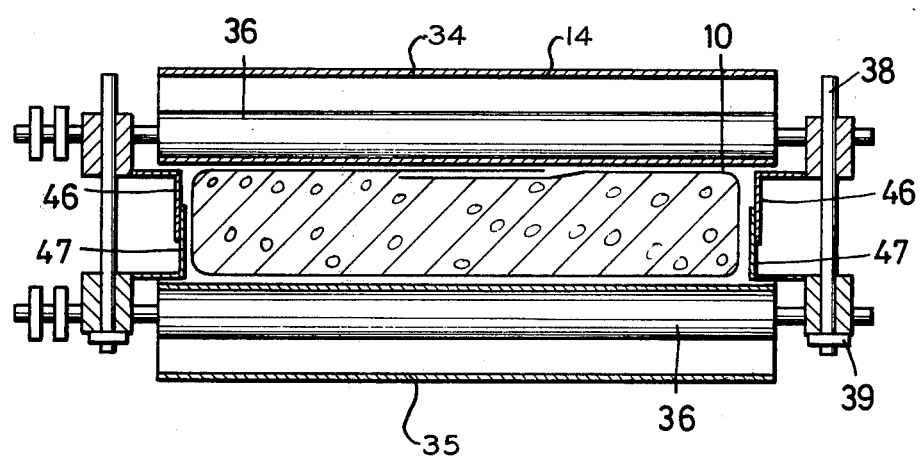

A further form of execution of the filter-unit, in its vertical section, is depicted in FIG. 5a, wherein FIG. 5b shows a cross-section through this form of execution in the direction of the line 5b–5b in FIG. 5a. By means of the feeding-unit 13, material to be filtered is entered into the continuously moving filter cloth 10. Two conveyor-belts 34, 35 closed in themselves and equivalent to the length of the filter-channel, lying parallel to each other, form two side walls of the channel lying diametrically opposite to each other. The representation of the cross section in FIG. 5b shows that the two remaining sides of the rectangular channel are formed by guiding-sheets 46 and 47 that can be moved towards each other making an adjustment of the cross-section of the channel height possible. The adjustment of the cross-section of the channel again is achieved by means of bolts 38 and nuts 39. At the end of the filter unit pressure is applied to the filter-cloth 10 over rollers 41 suspended by springs 40, a means which prevents the mixture from escaping from the filter. The springs can be hung according to the pressure in the filter. Guiding sheets 42 let the fluid run off.

The two conveyor-belts 34 and 35 in the execution example according to FIG. 5a can be omitted when, according to the execution-example in FIG. 6, the individual conveyor-rollers are set up close to each other so that the filter cloth 10 can rest against them. FIG. 6a depicts again a section in direction of the arrows 6a—6a of FIG. 6.

In FIG. 7, the filling unit 13 is again depicted but enlarged. I can be clearly seen how the mouthpiece at first entering as a tube into the filter-cloth 10 which is folded and partially overlapping, finally ends in a flat nozzle 13a that lies, stuck through the mentioned area of overlap, completely within the filter-cloth 10.

The FIGS. 8a to 8d show in top view and in cross-section different profiles for the conveyor belts, as they can find use in connection with the execution-examples of FIG. 4 and FIG. 5a. These profiles, however, are also valid for the execution of the channel according to FIGS. 2a and 2b and FIGS. 3a and 3b. The profile according to FIG. 8a, shown in plan in FIG. 8a, is meander-shaped on the side facing the filter cloth whereas the outer surface is smooth so that the filter fluid can run off inside the parallel rectangular channels obtained by the profiling.

FIG. 8b, shown in plan in FIG. 8b', shows an execution example for the conveyor belts, i.e. the walls of the filter channel as a sieve, whereas FIG. 8c mentions a metal grill as a further execution example. Finally, a metal grill can also be used advantageously as a conveyor belt according to FIG. 8d.

As shown in FIGS. 9 and 10, the press unit 2 of FIG. 1 consists mainly of two endless, continuous press bands, set up with a distance between the one atop the other and parallel together with the direction changing rollers 18 and the direction changing rollers 19. The press bands are kept under sufficient tension by means of tension-rollers 24. They are according to the diminishing fluid contents, within the filter cloth 10 in its progress through the press zone, slightly inclined toward each other in a V-shape. Between the lower face of the upper press-band 16 and the upper face of the lower press band 17, the filled filter cloth 10 moves with a continuously even but adjustable speed. The direction changing rollers 18 and 19 are, in the depicted way, parts of three independent double roller arrangements that in the two end zones each consist of a direction changing roller 18 or 19, respectively, and a roller 25 of smaller diameter, and between these double roller arrangements there is a further double roller arrangement formed by rollers 25. Each double roller arrangement comprises an upper roller pair and a lower roller pair. The lower roller pairs are journaled in stationary mounts. Each of the three upper pairs of rollers is connected by supports 23 to pressure cylinders 22 so that the upper pairs of rollers are forced in the direction of the lower pairs of rollers. They are pressed by the individual force of each single piston-cylinder combination 22. Each pair of upper rollers, as can be seen in FIG. 10, has a piston-cylinder combination attached to it and each piston-cylinder combination can be supplied separately with a desired, different or equal, hydraulic or pneumatic pressure, so that there is no fixed increase in pressing pressure throughout the press-zone, and a completely variable adjustment for each double roller arrangement is possible.

For the periodic increase or decrease of pressure on the press material contained within the filter cloth 10 during the transport through the press-zone, it is also desirable that either one or both press bands 16 and 17 are, while being of high solidity, pliable in such a way that a slight increase in volume of the press material results by increasing the distance of the press bands from each other between the rollers 18, 19, 25 and 25'. The number of pairs of rollers mentioned in the execution example for each press unit 2, 3 or 4 can be changed according to the construction of each machine. The pressing pressure, freely adjustable for each pair of rollers has to be determined according to the height of the press material, the speed, with which the press material is moved through the press zone, and the number of press rollers.

Any number of press units between the filter unit usable as a pre-press channel and the cleaning device can be assembled according to the modular principle, one next to the other, to form a press-bed. In each of the receptacles 20 assigned to each press unit, different press qualities can be obtained selectively.

After the filter cloth 10 has passed through one or more of the press units 2, 3 and 4 with constantly varying and individually adjustable pressure application, the filter cloth is led upwards at an angle at the end of the last pressure unit in a way especially evident from FIG. 11, to be spread apart at least partially, after the change of direction over the change of directon roller 27, by means of the laying out arm 50, so that the dry filter cake can be removed on the sheet 60, shown in FIG. 13, that is attached to the laying out arm.

The round, elliptic, or U-shaped laying out arm 50 can be turned around its bearing axle 53 and is best built in such a way that it can be moved along its longitudinal axes 56 to optimize the discharging of the filter cake. To remove the filter cake completely from the cloth, a scraper 61 (FIG. 13) is attached to the laying out arm 50, that is manufactures best from hard rubber or plastic. The discharging of the filter cake that accumulates on the slanted sheet 60 can be achieved with the help of a vibrator to reciprocate the laying out arm as indicated by 56.

To conduct the cloth in a perfect way, the second laying out arm 54 also can be moved along its longitudinal axes and can be turned. Finally, two laying out arms 50, 54 can be adjusted in their distance from each other. After passing through the spreading stage between the two laying out arms 50, 54 the partially unfolded filter cloth 10 is again gradually rejoined between the guiding roller 51 and the roller 55 so that through the lower part of the machine, it can return to the filling unit.

The segment between the two hanger like laying out arms 50 and 54 is shown in FIG. 12 in an elevation view to exemplify the partial spreading of the filter cloth 10. After the discharging of the dry filter cake from the filter cloth 10 it is cleaned thoroughly. Between the two laying out arms 50, 54 a combination of three different ways of cleaning can be applied.

After the filter cloth 10 has been emptied by the scraper 61, the cloth is sprayed with water or a different cleaning fluid. For this a pipe 29, with nozzles 57 is attached, through which the washing fluid is sprayed with sufficient pressure onto the filter cloth. According to the placement of the nozzles, rotating brushes or air pressure nozzles can be attached instead of or in addition to the water. The three cleaning possibilities can accordingly be used one-by-one or in combination. The washing fluid accumulates in the sheet 60a of the laying out arm 54 and runs off from there.

If only filtering processes are required, the device to discard the filter cake and to clean the filter cloth as shown in FIG. 11 together with the filtering unit following FIGS. 2–6, forms a unit. In a combined filter and pressing, however, one or more press units are inserted between the device in FIG. 11 and the filtering unit according to FIG. 1

SUMMARY

Accordingly, the invention provides apparatus for separation of solid fluid mixtures comprising means for routing an endless band of filter cloth which can be folded to form an endless tube, and which is longitudinally openable and closable, to permit cyclically introducing a mixture into the tube for filtering, the filtering, and removal of solids following filtering.

The apparatus further includes inlet means, e.g. FIG. 2b, 13, 62, for introducing the mixture into the tube, and a filter unit, e.g. FIG. 2a, 14 which provides a channel for passage of the tube filled with the mixture, for filtering of fluid from the mixture. The cross sectional flow area of the channel is adjustable, as shown e.g. in FIG. 3a. The channel is preferably disposed vertically or inclined with respect to the horizontal. Means for opening the filter tube following the filter unit for discharge of solids from the tube, such as is shown in FIGS. 11 and 12, are also provided. In the embodiment illustrated the tube is then automatically closed by reason of the manner in which it is threaded over its endless course. The inlet means and the filter unit are mounted on a first frame, and the opening means are mounted on a second frame, and the frames are separable to provide a modular construction. For example, referring to FIG. 1, the inlet means 13 (FIG. 2b) and the filter unit 14 are mounted on frame 1a brackets 1b, and the frame is secured in place by bolting 1c; while the opening means 50, etc. are mounted on frame 5a by bracket 5b, and the frame is secured in place by bolting 5c. The frame could of course be free standing frames not connected by such as bolting.

A press unit, such as 2, 3, or 4, can be interposed between the mentioned frames. The press unit exerts pressure over a length of the tube filled with mixture and expresses fluid therefrom. Means are provided for adjusting pressure applied by the press unit. For example, each press unit comprises two cooperating movable belts arranged for passage therebetween of the filled tube following issuance thereof from the filter unit, for pressing the filled tube to express fluid therefrom. The press unit comprises at least one pair of press rollers in engagement with one of the belts for exerting pressure on the belt, and means for adjusting the pressure exerted by the press rollers. The frames and press unit are separably providing a modular construction. Pairs of press rollers can be seen in FIG. 9, wherein three such pairs are disposed over the lower run of upper belt 16, and wherein hydraulic means 22 are provided for adjusting the pressure.

As is exemplified by FIG. 3a, the filter unit can be formed by two U-shaped members disposed in opposed relation defining the channel. The U-shaped members are movable toward and away from each other, to permit the adjustment in cross section. The U-shaped members have grooves 15 for drainage of the fluid from the filter unit.

In a preferred embodiment, first drainage means for draining fluid removed by the filter unit are provided, such as outlet 21 in FIG. 2a, and second drainage means for separately draining fluid removed by the press, such as pan 20 in FIG. 9 are provided.

Means for assisting in removal of solids from the filter cloth, such as scraper 50 shown in FIGS. 12 and 13, and means for cleaning the filter cloth following the discharge of solids therefrom, such as spray pipe 29 shown in FIG. 12, can be provided.

Drive means as are known for endless belts can be used. Desirably, the drive is variable, permitting variation in the speed of the tube for further control of the separation.

What is claimed is:
1. Apparatus for continuous separation of solid-fluid mixtures comprising:
   a. an endless band of filter cloth folded to form an endless tube which is longitudinally openable and closable and routing means to permit cyclically introducing a mixture into the tube for filtering, filtering and removal of solids following filtering;
   b. inlet means for introducing the the mixture into the tube;
   c. a filter unit providing a channel for passage of the tube filled with the mixture and folded as aforesaid, for filtration of fluid from the mixture, the cross sectional flow area of the channel being adjustable;
   d. means for opening the filter tube following the filter unit for discharge of solids from the tube;
   e. the inlet means and the filter unit being mounted on a first frame and the opening means being mounted on a second frame, said frames being separable to provide a modular construction.

2. Apparatus of claim 1, and a press unit interposed between said first frame and said second frame, comprising two cooperating, movable belts arranged for passage therebetween of the filled tube following issuance thereof from the filter unit, for pressing of the filled tube to express fluid therefrom, said press unit comprising at least one pair of press rollers in engagement with one of the belts for exerting pressure on the belt, and means for adjusting the pressure exerted by the press rollers, said frames and press unit being separable providing a modular construction.

3. Apparatus of claim 2, said pressure adjusting means comprising a piston-cylinder combination.

4. Apparatus of claim 2, and first drainage means for draining fluid removed by the filter unit and second drainage means for separately draining fluid removed by the press unit.

5. Apparatus of claim 2, there being at least two of said press units.

6. Apparatus of claim 2, there being at least two pairs of said press rollers for said press unit.

7. Apparatus of claim 2, there being at least two of said press units, each having at least two pairs of said press rollers.

8. Apparatus of claim 1, the filter unit having two U-shaped members disposed in opposed relation defining said channel, the U-shaped members being movable toward and away from each other to permit said adjustment in cross section, the U-shaped members having grooves formed therein for drainage of fluid from the filter unit.

9. Apparatus of claim 1, said filter unit channel being defined by spaced conveyor belts.

10. Apparatus of claim 1, said filter unit channel being defined by closely spaced rollers.

11. Apparatus of claim 1, and means for assisting in removal of the solids following opening of the filter tube by the opening means.

12. Apparatus according to claim 1, and means for cleaning the filter cloth following the discharge of solids therefrom.

13. Apparatus of claim 1, and a press unit interposed between said first frame and said second frame, for applying pressure to a length portion of the tube filled with the mixture to express fluid therefrom, and means for adjusting pressure exerted by the press unit, said frames and press unit being separable providing a modular construction.

14. Apparatus for claim 13, there being at least two of said press units.

15. Apparatus according to claim 14, the press units also being separable to provide modular construction.

* * * * *

UNITED STATES PATENT OFFICE
CERTIFICATE OF CORRECTION

PATENT NO. : 4,017,398
DATED : April 12, 1977
INVENTOR(S) : Otto Hartmann, Hans Brunner and, Thomas Hartmann It is certified that error appears in the above-identified patent and that said Letters Patent are hereby corrected as shown below:

First page, the entry for item [73] after "Hartmann" insert --Maschinenbau Kommanditgesellschaft--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks